Dec. 18, 1962  R. M. PHILLIPS  3,069,051
INDICATOR SYSTEM FOR A LIQUID SUPPLY SYSTEM
Filed July 22, 1959  2 Sheets-Sheet 1
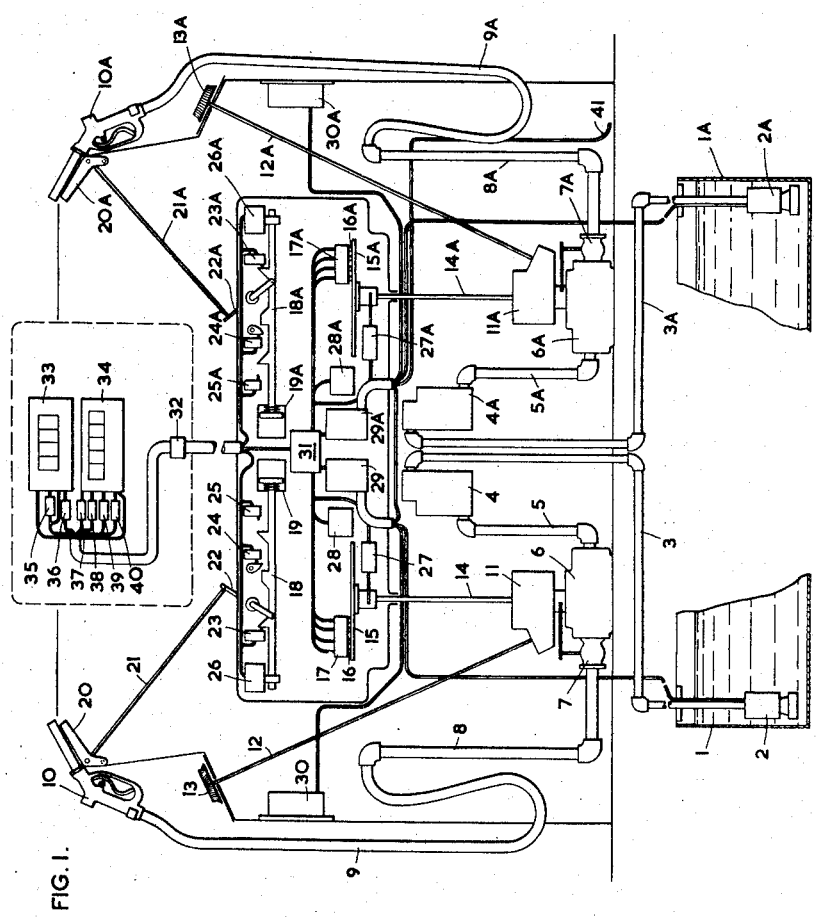
FIG. I.
INVENTOR
RICHARD MORRISON PHILLIPS
BY *Morgan Finnegan, Durham & Pine*
ATTORNEYS Dec. 18, 1962  R. M. PHILLIPS  3,069,051
INDICATOR SYSTEM FOR A LIQUID SUPPLY SYSTEM
Filed July 22, 1959  2 Sheets-Sheet 2
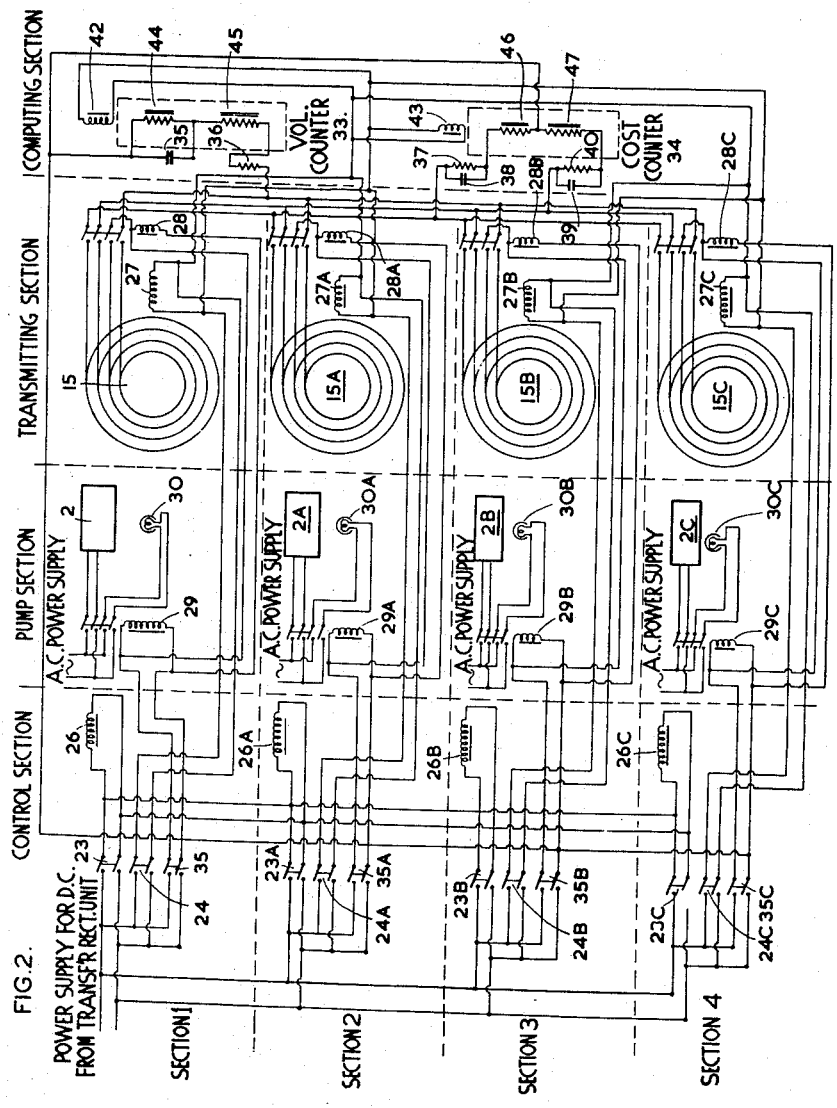
INVENTOR
RICHARD MORRISON PHILLIPS
BY
ATTORNEYS

United States Patent Office 3,069,051
Patented Dec. 18, 1962

3,069,051
INDICATOR SYSTEM FOR A LIQUID SUPPLY
SYSTEM
Richard M. Phillips, Sunbury-on-Thames, England, assignor to The British Petroleum Company Limited, London, England, a British joint-stock corporation
Filed July 22, 1959, Ser. No. 828,830
Claims priority, application Great Britain July 30, 1958
14 Claims. (Cl. 222—26)

This invention relates to an improved indicator system. This invention also relates to an improved dispensing unit and liquid product supply system comprising said indicator system.

Conventional equipment employed at roadside fuelling station consists of a fuel storage tank, pump, a unit consisting of a fuel meter with mechanically driven computor in association therewith and a supply hose. When a station has provision for simultaneously dispensing the same product at two or more hoses, each hose is associated with a separate meter and computor; a single pump, usually a submersible pump associated with the storage tank, supplies fuel to a manifold and thence to the separate meters.

There has been described, in the prior art, a system for dispensing motor fuel at service stations in which indicator means are located at a distance from the dispensing unit and operated, from a meter mechanism, through a self-synchronising motor generator system.

It is an object of the present invention to provide an indicator system by which is indicated the quantity of a fluid material which has passed through a selected meter of a plurality of meters. This quantity may be the total quantity or the quantity passed subsequent to the setting of the apparatus by an operator.

It is a further object to provide an improved indicator system, dispensing unit and liquid product supply system.

It is a further object to provide a liquid product supply system for use in the dispensing of motor fuel, particularly at roadside fuelling stations.

It is a further object to provide a liquid product supply system by which a plurality of different fuels can be dispensed from the or each dispensing unit.

Other objects will appear hereinafter.

According to one aspect of the present invention there is provided an indicator system comprising an indicator, for indicating the quantity of a fluid material which has passed through a selected meter of a plurality of meters, an actuating mechanism for operating the indicator in response to electrical signals transmitted to the mechanism in response to the operation of a selected meter and a switch for selecting electrical signals, corresponding to the selected meter, for the operation of the indicator.

The indicator system of this invention is suitable for use in the dispensing of motor fuels and is particularly adapted for use in a dispensing unit which provides for the dispensing of any one of a range of liquid fuels of different character or quality at a single fuel dispensing post.

According to a further feature, there are provided two indicators adapted to indicate different values, mutually related. Thus there is provided an indicator system as described comprising (a) a first indicator for indicating the quantity of fluid material which has passed through a selected meter, (b) a second indicator, for indicating a value, being a function of said quantity and (c) an actuating mechanism for operating the first and second indicators in response to electrical signals transmitted to the mechanism.

Suitably the actuating mechanism comprises a gear system for coordinating the action of the first and second indicators according to a predetermined interrelationship. Suitably, the gear system is of a type which provides for a variable gear ratio.

Usually the indicators used in accordance with this invention each comprise (a) a rotating pointer moving over a circular dial or (b) a cylindrical register.

In the application of an indicator system incorporating this further feature to the dispensing of motor fuels, the "first indicator" may be employed to indicate the volume of fuel dispensed in the course of a single sale and the "second indicator" may be employed to indicate the total price of this volume of fuel. The gear system employed to establish the required relationship between volume and total price will preferably have a gear ratio which is variable by an operator in order that the gear system may be used in the dispensing of fuels having differing prices per unit volume.

If desired the indicator system may comprise a "unit price indicator" for showing the relationship between the values shown by the "volume indicator" and "total price indicator." Thus for example if the so-called "volume indicator" and "total price indicator" show respectively volume of fuel passing the meter and the total price thereof, the unit price indicator may be adapted to show the price per unit volume of the selected product. It will be understood that in accordance with the invention the so-called "volume indicator" and "price indicator" may be employed to indicate other values and the use of the terms does not constitute a limitation to indicators which are marked and geared for the indication of volume and price. Thus in special applications an indicator system according to the invention may be employed to give simultaneous indication of volume and weight. The "unit price indicator" may be connected into mechanical association with gear ratio selection means when used in association with the gear system of the indicator system, whereby volume, price and price per unit volume indications are correctly coordinated.

Preferably the indicator systems hereinbefore described when employed for dispensing motor fuels are used in a dispensing unit having a plurality of supply hoses, at least one for each different fuel to be dispensed, to ensure that there is no mixing of fuels within supply lines. To ensure that the correct hose is brought into operation it is preferred that hose ends, which will usually be fitted with a trigger operated nozzle, are retained in a support in such manner that only one hose can be moved into an operating position at a given time. To this end, it is preferred that locking means be provided to secure, at given time, all hoses but the one to be brought into use, the locking means being coordinated with the switch by which the electrical signals from the metering system are fed to the actuating mechanism of the indicator system.

Thus according to another aspect of this invention there is provided a dispensing unit, for the supply of any one of a plurality of fluid materials, comprising an indicator system as hereinbefore described and a set of supply pipes each pipe supplying a different fluid material each pipe being held, when not in use, in a support and being movable from its support when released for use and each pipe being held in its support by locking means adapted to release a selected pipe only when all other pipes are restrained, by said locking means, in their supports, said locking means and the switch of the indictaor system coacting to provide for the selection of electrical signals corresponding to a meter through which a required fluid material passes and for the release of the pipe through which this material is dispensed.

Alternatively the dispensing unit comprises an indicator system as hereinbefore described and a set of supply pipes, each pipe supplying a different fluid material, each pipe being removably held in a support and being capable of movement to a different position for use and each pipe having associated therewith a switch connected in an electrical circuit which is connected to electrical or electromechanial means which prevent the supply of any fuel when two or more hoses are removed from their supports.

Suitable electrical transmitting and receiving systems for use in the present invention are as follows. In each case the transmitter will be operated in response to the movement of a rotating shaft.

If desired, there may be used an electrical pulse generator element consisting of at least three endless tracks, each track being adapted to operate in conjunction with a follower and to give rise to a pulse signal when relative movement takes place between the track and an associated follower, at least two followers being provided whereby, in use, at least two pulse signals are derived simultaneously, the characteristics of at least two of the tracks being such that the number of pulses per unit time derived from these two tracks, at the same rate of relative movement between track and follower, is different.

If the pulse generator element bears only three tracks, that is, tracks A, B and C, track A may be employed to provide a reference signal and either track B or C, at the selection of the operator, may be employed to provide a second signal. By changing the source of the second signal from track B to track C, the ratio of the number of pulses in unit time in the two signals may be changed in accordance with the pulse generating characteristics of the three tracks.

According to a modification in accordance with the invention, the pulse generator element will comprise an endless track, adapted to operate in conjunction with a follower and to give rise to a pulse signal, and a set of units consisting of at least two units, each unit bearing at least one endless track, as hereinbefore described, and being adapted for attachment to the element in such manner that, in use, the tracks of the element and unit attached thereto constitute a source of two trains of pulse signals having a fixed ratio of pulses per unit time, said ratio being of a value which is variable by the use of a different unit of said set.

In accordance with the invention, each or any of the tracks may consist of alternate sections of electrically conducting and non-conducting material; the track will be used in conjunction with a follower consisting of an electrical contact whereby a pulse train is constituted when relative movement takes place between the track and follower. Usually all conducting sections of a given track will be electrically connected; if desired, current may be passed to and/or from these sections by means of a second contact in continuous connection with a conducting track.

Suitably, each track constitutes a ring upon the surface of a disc. If desired one track only may be provided on each disc and two or more discs mounted on a common axle. If desired one disc may be fixed to the axle and the other discs constitute a set from which a required disc may be selected and temporarily secured upon said axle. Alternatively, a plurality of tracks or all of the tracks may constitute a system of concentric rings upon a single disc. One or more followers may be adapted for movement, at the control of the operator, from one track to another; if desired each track may have its own follower and the required pulse trains selected by use of a mechanical or electrical switching system.

While the apparatus may be designed for use with moving followers and stationary tracks, it will usually be found preferable to maintain the followers stationary and to employ rotating discs, cylinders or bands.

The pulse generator is suitable for the operation of a pair of receivers, each receiver being fed with a pulse train from the generator. The receivers may be adapted to yield a mechanical out-put, for example wherein a shaft is rotated through a predetermined angle for each pulse received. Thus, by the revolution of a driving shaft on the transmitter, two shafts may be operated, in response, in a manner such that the ratio of the angular movement of the two shafts, in given time, is a fixed value, determined by the characteristics of the endless tracks of the pulse generator element.

One form of receiver suitable for use with pulse generators according to this invention, requires for its operation, the transmission of pulses in pairs. This may be achieved by a pulse generator which (a) provides an even number of pulse creating zones, for example, conducting segments in a given track or (b) provides two tracks having an identical number of pulse creating zones, for example, conducting segments, the zones in different tracks being out of phase, or (c) makes use of the two followers on a single track, the followers being located so that, at any given time, one follower is out of contact with a pulse creating zone, for example a conducting segment.

Apparatus according to this invention also comprises the combination of the indicator system or dispensing system with the liquid material supply and metering system.

Thus according to another aspect of this invention there is provided a liquid product supply system comprising an indicator system as hereinbefore described and a set of storage tanks, each tank being provided to contain a different liquid product and having associated therewith a pump, a meter having a mechanical output responsive to the quantity of product passes therethrough and a transmitter mechanically driven by the meter and adapted to transmit monitoring electrical signals, in response to the mechanical output of the meter, to the actuating mechanism of the indicator system.

It will be understood that in the simplest case a "set" of storage tanks consists of two tanks. Thus, for example, as applied to the sale of motor fuel, a selection may be given between regular and premium grades.

The supply system may incorporate a locking system for supply hoses, as previously described or a system for preventing the supply of fuel when two or more supply hoses are withdrawn from their supports, as previously and hereinafter described.

In a liquid product supply system, according to this invention, for dispensing fuel to vehicles it is preferred that storage tanks, pumps and meters be located below ground level, as hereinafter defined and the indicator system be located above ground level, as hereinafter defined.

By "ground level" we mean the level of the area within which vehicles would stand while being supplied from the system of this invention.

Suitably, in a system according to this invention for use in dispensing fuel to vehicles, the indicator system is portable. Thus a small portable indicator unit, connected to the remainder of the system by a flexible electrical lead, may be set up by the operator within view from the driving position of a vehicle to which fuel is to be supplied.

Suitably two indicator systems will be employed simultaneously for a given sale, these systems being adapted to operate electrically in parallel, one system being a fixed unit, located to provide indication to the operator of the quantity of fuel dispensed to a vehicle and a second system being a portable unit and adapted for location to provide indication at the driving position of said vehicle of said quantity.

It will be understood that in accordance with this invention a plurality of dispensing positions, each equipped with an indicator system and set of supply hoses, may be operated using a single storage tank and pump for each different liquid material dispensed. A separate meter may be provided in association with each supply hose; alternatively, a single meter may be provided for each liquid material dispensed and an electrical selection system provided to enable only one dispensing position to be supplied through a given meter at a given time. It will be apparent that, if desired, a compromise may be effected between these alternatives wherein, for operating convenience, certain dispensing positions share the use of a given meter.

It will be understood that the liquid product supply system according to this invention may comprise also conventional ancillary equipment, for example, filters, air-separators, totalisers, supply hoses and supply nozzles.

The invention is illustrated but not limited with reference to the accompanying FIGURES 1 and 2.

FIGURE 1 is a schematic representation of a fuel dispensing system for the supply of two different products.

FIGURE 2 is a circuit diagram for a system for dispensing any one of four different products and readily adaptable for use in the system illustrated in FIGURE 1.

With reference to FIGURES 1 and 2:

An underground fuel storage tank 1 is provided with a submerged pump 2 and take-off line 3 by which fuel is fed through an air eliminator and strainer unit 4 and line 5 to a fuel meter 6. From meter 6 fuel is supplied through an automatic shut-off valve 7 and rigid line 8 to a flexible fuel dispensing hose 9, terminating in trigger control nozzle 10. The meter 6 may be preset to pass a predetermined volume of fuel by mechanism 11 operated by shaft 12, which terminates in the preset control knob 13.

When meter 6 is in operation, shaft 14 is thereby caused to rotate. This shaft rotates a pulse transmitter disc 15 under a set of contact brushes 16 held in brush box 17.

The transmitter disc 15 is provided with four concentric tracks, each track having alternate conducting and non-conducting sections. Each track is followed by a brush 16 whereby, on rotation of the disc, a pulse train is generated by each brush, the number of pulses per revolution being determined by the number of sections. After use the transmiter is reset by solenoid 27.

Locking and switch operation is controlled by switch bar 18 which terminates in a spring loaded pneumatic delay unit 19.

Removal of nozzle 10 operates the switch bar control lever 20 which, through rod 21 and crank 22 actuates bar 18. Movement of this bar in turn actuates the switch bar lock switch 23, the transmitter and counter reset switch 24 and the pump, transmitter and display light selector switch 25. Locking of the switch bar is provided by solenoid 26.

The system also comprises a transmitter relay 28, a meter and display light relay 29 and display light 30.

The units described to this point constiute apparatus for dispensing one of the two fuels which may be dispensed by the system. The system also comprises a second set of units identical to the units so far described; these are identified in the figures by the addition of the suffix "A" to the numeral given.

Additionally, the system comprises a power pack 31 having a 90 volt D.C. output and fed by mains input lead 41. The foregoing units are connected to a detachable indicator head by a multi-pin plug and socket 32. The indicator head comprises a high speed pulse counter 33 for the indication of volume of fuel dispensed and a high speed pulse counter 34 for indicating the total cost of this fuel. Counters 33 and 34 are electrically driven in response to the signals transmitted by transmitter disc 15. The lead from plug and socket 32 is provided with resistors 36, 37 and 40 and condensers 35, 38 and 39.

Suitably all units except the indicator head, nozzles 10 and 10a, hoses 9 and 9a, preset control knobs 13 and 13a, and levers 20 and 20a are installed below ground level.

To operate the system, a selected nozzle is withdrawn from its support. Thus when nozzle 10 is withdrawn, lever 20 and rod 21 free the switch bar 18 and allows the pneumatic spring of unit 19 to draw the bar along. Once this bar has moved a predetermined distance both bar lock solenoids 26 and 26a are energised; bar 18 is nevertheless free to complete its journey because it has already moved past a latch but the other bar 18a is locked. This mechanism ensures that even if nozzle 10a is inadvertently withdrawn before nozzle 10 has replaced, meter 6a or its associated pump circuit cannot be energised until both nozzles have been replaced and a further selection made. Further travel of the switch bar 18 resets the counters 33 and 34 and transmiter 15 and, finally starts the pump 2 and switches on display light 30.

The operator dispenses the required quantity or value of fuel either by manual or preset control and replaces nozzle 10. Replacement of this nozzle stops pump 2, switches off display light 30 and unlocks the switch bars 18 and 18a. The counters are not reset at this stage and will continue to indicate the sale until a nozzle is again withdrawn from its support.

With reference to FIGURE 2, in addition to the circuit required for the operation of the two supply units shown in FIGURE 1, there is illustrated the further components required to operate a four supply unit system. The circuit components for the further two supply units are characterised by the suffixes "B" and "C" respectively.

In this circuit is also shown the reset solenoids 42 and 43 of the volume counter and cost counter, respectively; the operating coils 44 and 45 of the volume counter and the operating coils 46 and 47 of the cost counter.

If desired, electrical connection may be provided between the indicator head and a centralised totaliser and/or a ticket printing cash register.

It is believed that by the use of an indicator system dispensing unit and liquid product supply system according to this invention it may prove possible to obtain substantial advantages in roadside fueling service, for example by:

(1) Reducing the number of Kerbside pumps which are necessary to supply products to provide standby equipment.

(2) Providing more room on the sales "island."

(3) Reducing the area required as standing space for vehicles since all products may be made available at one fueling position. Thus at present time, by way of contrast, the sale of five products at five Kerbside pumps necessitates an "island" length of 15 feet.

Furthermore:

(4) The indicator head may be self containing except for quick acting electrical connections and one actuating lever to operate the trigger nozzle locking device; in the event of this piece of equipment breaking down its replacement by a spare (which could be held at each station) would require only a few minutes of an operator's time and would not require skilled fitting.

(5) The proposed system can be constructed by using standard components or adaptations of existing instruments which have been proved in service.

I claim:

1. An indicator system comprising (a) an indicator, for use in connection with a plurality of meters and supply pipes, each meter being in connection with a different supply pipe, each pipe being held, when not in use, in a support, and being moveable from its support when released for use, and for indicating the quantity of a fluid material which has passed through a selected meter and pipe of said plurality of meters and supply pipes, (b) an actuating mechanism comprising a receiver by which signals received are converted to mechanical movement, for operating the indicator, (c) a plurality of transmitters, each transmitter being being adapted for operation in association with a different meter to generate a train of signals in response to the operation of an associated meter, for the operation of said actuating mechanism of said indicator and (d) a switch for selecting a train of signals, corresponding to the selected meter, the switch being adapted for actuation upon the removal of the supply pipe corresponding to the selected meter from its support.

2. An indicator system, for use in connection with a plurality of meters, comprising (a) a first indicator, for indicating the quantity of a fluid which has passed through a selected meter of said plurality of meters, (b) a second indicator, for indicating a value being a function of said quantity, each of said first and second indicators being operated by a different train of signals, (c) actuating mechanism, comprising a receiver by which signals received are converted to mechanical movement, for operating said first and second indicators, (d) a plurality of transmitters, each transmitter being adapted for operation in association with a different meter to generate at least two trains of signals in response to the operation of an associated meter, for the operation of said actuating mechanism of, respectively, said first and second indicators, a first train which is a measure of said quantity of fluid which has passed through said selected meter, and a second train which is a measure of said value which is a function of said quantity, and (e) a switch for selecting trains of signals, corresponding to the selected meter.

3. An indicator system as specified in claim 1 in which at least one of said plurality of transmitters comprises at least one endless track, said track being adapted to operate in conjunction with a follower and to give rise to a train of pulse signals when relative movement takes place between the track and an associated follower.

4. An indicator system as specified in claim 3 in which said endless track comprises alternate sections of electrical conducting and non-conducting material.

5. An indicator system as specified in claim 3 in which at least one of said endless tracks constitutes a ring upon a disk.

6. A dispensing unit, for the supply of any one of a plurality of fluid materials, comprising an indicator system as specified in claim 1, a plurality of meters and a plurality of supply pipes, each meter being in connection with a different supply pipe, each meter being in association with a different transmitter, each pipe, when in use, supplying a different fluid material, each pipe being held, when not in use, in a support and being moveable from its support when released for use and each pipe being held in its support by locking means adapted to release a selected pipe only when all other pipes are restrained by said locking means, in their supports, said locking means and the switch of the indicator system coacting to provide for the selection of electrical signals corresponding to a meter through which a required fluid material passes and for the release of the pipe through which this material is dispersed.

7. A liquid product supply system comprising, in connection, an indicator system as specified in claim 1, and a set of liquid product supply and metering units each comprising a storage tank, a pump, a meter having a mechanical output responsive to the quantity of product passed therethrough and a transmitter mechanically driven by the meter and adapted to transmit monitoring electrical signals, in response to the mechanical output of the meter, to the actuating mechanism of the indicator system.

8. A liquid product supply system comprising a dispensing unit as specified in claim 6 and a set of liquid product supply and metering units each comprising a storage tank, a pump, a meter having a mechanical output responsive to the quantity of product passed therethrough and a transmitter mechanically driven by the meter and adapted to transmit monitoring electrical signals, in response to the mechanical output of the meter, to the actuating mechanism of the indicator system of said dispensing unit.

9. An indicator system as specified in claim 2 in which at least one of said transmitters comprises an element bearing an endless track, said element having associated therewith a unit bearing an endless track, each track being adapted to operate in conjunction with a follower and to give rise to a pulse signal when relative movement takes place between the track and an associated follower, in use, at least two followers being provided whereby at least two pulse signals are derived simultaneously, said unit being adapted for attachment to the element in such manner that, in use, the tracks of the element and unit attached thereto constitute a series of two trains of pulse signals having a fixed ratio of pulses per unit time, said ratio being of a value which is variable by the use of a different unit having a different track characteristic.

10. An indicator system as specified in claim 9 in which at least one of said endless tracks comprises alternate sections of electrical conducting and non-conducting material.

11. An indicator system as specified in claim 9 in which at least one of said endless tracks constitutes a ring upon a disk.

12. A dispensing unit, for the supply of any one of a plurality of fluid materials, comprising an indicator system as specified in claim 9, a plurality of meters and a plurality of supply pipes, each meter being in connection with a different supply pipe, each meter being in association with a different transmitter, each pipe, when in use, supplying a different fluid material, each pipe being held, when not in use, in a support and being moveable from its support when released for use and each pipe being held in its support by locking means adapted to release a selected pipe only when all other pipes are restrained by said locking means, in their supports, said locking means and the switch of the indicator system coacting to provide for the selection of electrical signals corresponding to a meter through which a required fluid material passes and for the release of the pipe through which this material is dispensed.

13. A liquid product supply system comprising, in connection, an indicator system as specified in claim 9, and a set of liquid product supply and metering units each comprising a storage tank, a pump, a meter having a mechanical output responsive to the quantity of product passed therethrough and a transmitter mechanically driven by the meter and adapted to transmit monitoring electrical signals, in response to the mechanical output of the meter, to the actuating mechanism of the indicator system.

14. A liquid product supply system comprising a dispensing unit as specified in claim 12 and a set of liquid product supply and metering units each comprising a storage tank, a pump, a meter having a mechanical output responsive to the quantity of product passed therethrough and a transmitter mechanically driven by the meter and adapted to transmit monitoring electrical signals, in response to the mechanical output of the meter, to the actuating mechanism of the indicator system of said dispensing unit.

References Cited in the file of this patent

UNITED STATES PATENTS

| | | |
|---|---|---|
| 2,319,444 | Crosby | May 18, 1943 |
| 2,379,785 | Bugg | July 3, 1945 |
| 2,510,093 | Ferguson et al. | June 6, 1950 |
| 2,612,288 | Hazard | Sept. 30, 1952 |
| 2,935,229 | Robinson | May 3, 1960 |